(12) United States Patent
Vom Stein

(10) Patent No.: US 6,237,207 B1
(45) Date of Patent: May 29, 2001

(54) ASSEMBLY AID FOR MACHINE PARTS, IN PARTICULAR FOR HOUSING CLOSURE UNITS

(75) Inventor: Hans-Joachim Vom Stein, Leverkusen (DE)

(73) Assignee: CR Elastomere GmbH, Leverkusen (DE)

( * ) Notice: Subject to any disclaimer, the term of this patent is extended or adjusted under 35 U.S.C. 154(b) by 0 days.

(21) Appl. No.: 09/000,387

(22) PCT Filed: Jul. 23, 1996

(86) PCT No.: PCT/DE96/01397

§ 371 Date: Aug. 28, 1998

§ 102(e) Date: Aug. 28, 1998

(87) PCT Pub. No.: WO97/04923

PCT Pub. Date: Feb. 13, 1997

(30) Foreign Application Priority Data

Jul. 25, 1995 (DE) .............................. 195 27 042

(51) Int. Cl.[7] ................................... B25B 27/14
(52) U.S. Cl. ................. 29/281.1; 29/281.5; 269/47; 269/900
(58) Field of Search ................ 269/254 R, 289 R, 269/52, 303, 305, 309, 900, 272, 271; 29/281.1, 281.2, 281.5, 281.6

(56) References Cited

U.S. PATENT DOCUMENTS

| | | |
|---|---|---|
| 3,316,949 | 5/1967 | Canfield . |
| 3,538,579 | * 11/1970 | Sprenger .............................. 29/281.1 |
| 5,355,573 | * 10/1994 | Hayashi et al. ..................... 29/281.1 |

FOREIGN PATENT DOCUMENTS

| | | |
|---|---|---|
| 0272775 | 6/1988 | (DE) . |
| 4217131 C1 | 12/1993 | (DE) . |
| 5937024 | 2/1984 | (JP) . |

\* cited by examiner

*Primary Examiner*—Joseph J. Hail, III
*Assistant Examiner*—Daniel Shanley
(74) *Attorney, Agent, or Firm*—Vedder, Price, Kaufman & Kammholz

(57) ABSTRACT

The invention refers to an auxiliary assembly element for automatic mounting of machine parts, such as housing sealing covers for combustion engines, where the auxiliary assembly element, which may be attached to the machine part and easily removed, receives the mounting devices for the connection of the machine parts with the machine into supports where they are position-oriented and arrested, so that the mounting devices, together with the machine part, may be supplied to and moved directly into the connection position with the machine via the auxiliary assembly element with the use of an industrial robot or similar.

11 Claims, 2 Drawing Sheets

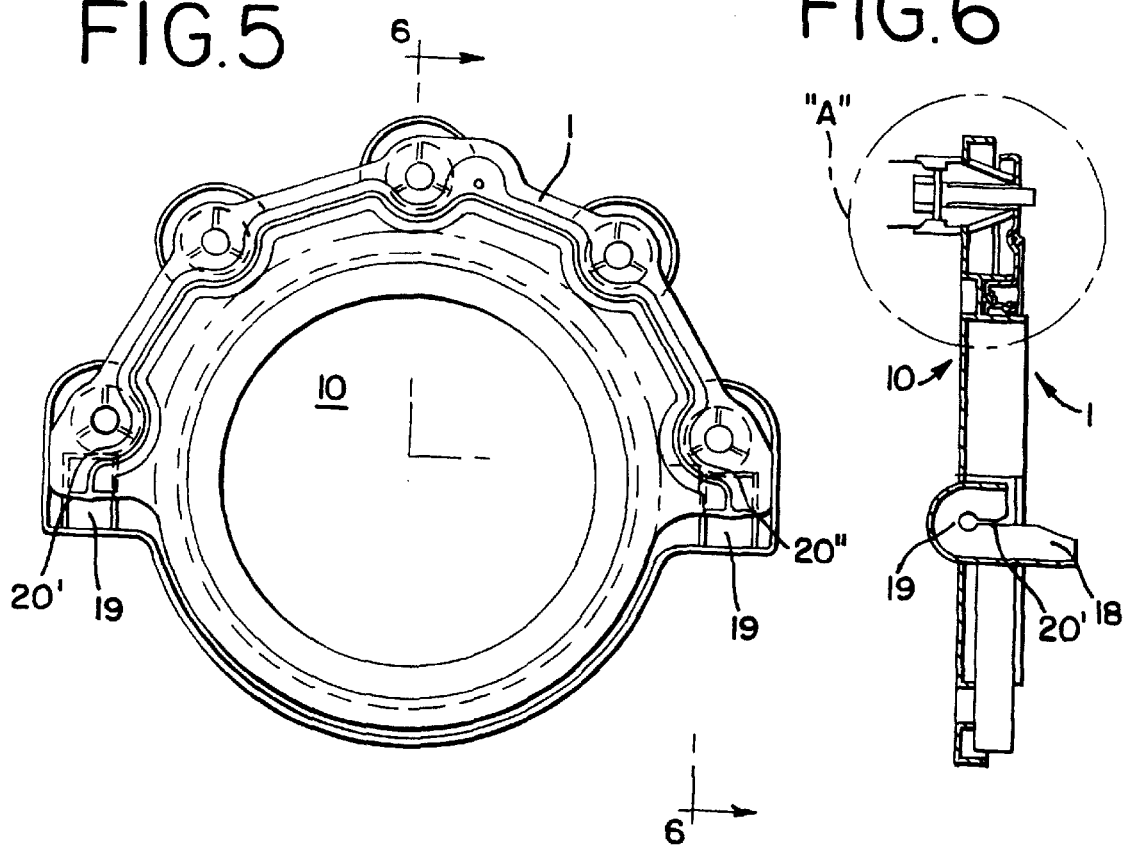
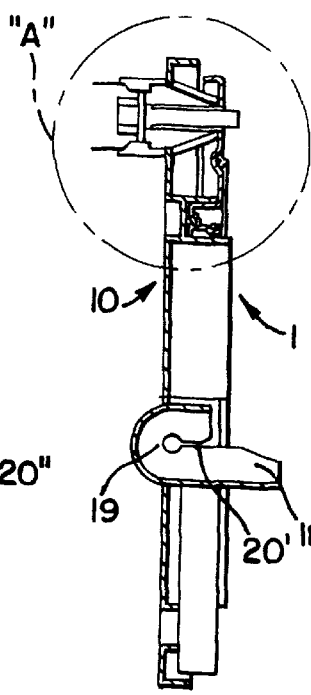
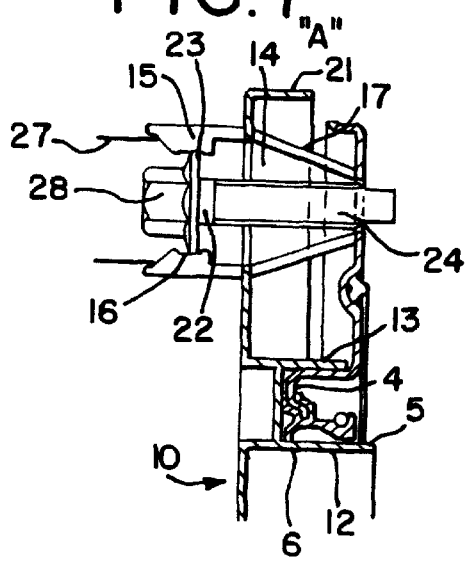
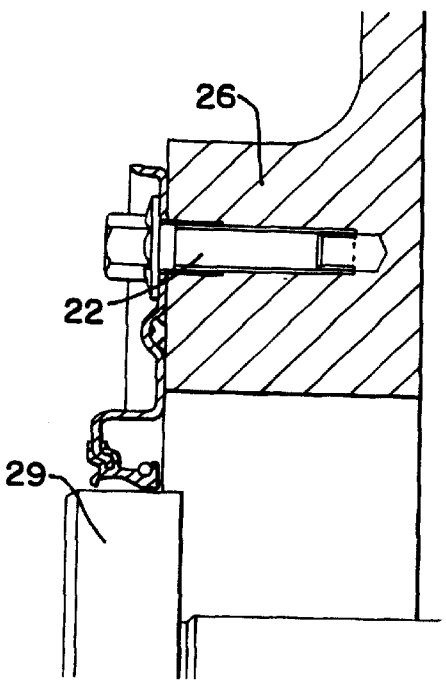

ASSEMBLY AID FOR MACHINE PARTS, IN PARTICULAR FOR HOUSING CLOSURE UNITS

BACKGROUND OF THE INVENTION

This invention refers to an auxiliary assembly element for machine parts which have to be connected with the machine with the aid of additional mounting devices, consisting of an auxiliary element which may be attached to and easily removed from the machine part, and which may be removed after the assembly is completed. This invention concerns particularly an auxiliary assembly for housing sealing covers with integrated radial shaft sealing ring and through holes for mounting screws, particularly for crank shafts, cam shafts, and gear housings of combustion engines, consisting of a base element which extends essentially radially with at least one axially extending ring-shaped projection for the concentric accommodation of the housing sealing cover.

In order to mount machine parts it is required that the machine part to be mounted is moved to the machine in true position and is then connected with it. The connection of such machine parts often occurs by using mostly standardized mounting elements, such as rivets, screws, clamp pins, etc. While in the construction of large machinery, the assembly of machine parts takes place mostly manually, possibly with the help of special holding tools, where the mounting tools after assembly are moved into their mounting position individually and most of the time by hand, the mass production of machine housings, such as electric motors, combustion engines, control gears, etc., presents special requirements for the possibility of automatic mounting.

In the construction of motor vehicles in particular, the housing sealing covers, for instance, which have to be mounted with several screws on the motor or gear housing, are moved to the mounting location and also positioned there and screw connected, with automatic tools, such as industrial robots. This requires that the housing sealing covers may be removed from storage in position-oriented position and may be transported to the motor or gear housing, resp., while the mounting screws should also be transported in true position together with the housing sealing cover, if possible.

In DE-PS DE 42 17 131 a housing sealing cover for a crank shaft housing for combustion engines is described, in which the mounting screws are kept friction-locked in the screw through-holes of the housing sealing cover so that when the housing sealing cover is moved to be attached to the crank shaft housing the mounting screws are automatically also moved into the screw position. While the screws for the mounting of the housing sealing cover are directly available, the friction-locked connection of the screws in the bore holes of the housing sealing cover is problematic, however, as is the necessary positioning of the screws in the direction of the threaded holes of the machine housing during the mounting process. In addition, the housing sealing covers which are equipped with such screws cannot be stacked and are therefore not suitable for automatic pick-up by industrial robots.

Finally in housing sealing covers with a shaft extending through the cover in the assembly stage, which require additional sealing, the automatic mounting is made more difficult because the sealing lip of the radial shaft sealing ring integrated in the housing sealing cover must be radially expanded when the cover is moved onto the motor shaft.

In addition, an auxiliary assembly element is known from EP-PS 0 272 775 which is designed to make the mounting of a housing sealing cover with integrated radial shaft sealing ring easier. The auxiliary assembly element consists essentially of a base element of plastic materials which extends radially and with a radial cylindrical shell fastened on the inside to support the sealing lip of the radial shaft sealing ring, especially to push the housing cover with its sealing ring onto the end of the shaft. In addition, the auxiliary assembly element has a radial outer second axial ring-shaped cylinder projection, which encloses a corresponding recess of the housing sealing cover and thereby ensures a centric position of the sealing lip of the radial shaft sealing ring. The housing sealing cover is attached in assembled condition with the crank shaft housing of a combustion engine via several screws. The mounting screws have to be supplied separately after positioning and alignment of the housing sealing cover.

The invention is based on the task to simplify the assembly of machine parts which are connected via additional mounting devices with the machine housing, and primarily to permit fully automatic mounting by industrial robot. This includes safe transport and storage of such machine parts.

This task is accomplished in accordance with the invention by an auxiliary assembly element, which is equipped with supports for a position-oriented accommodation and arresting of the mounting devices. The use of an auxiliary assembly element does increase the production costs of the machine parts because an auxiliary assembly element must be made available and connected with the machine part. The possibility of multiple use of such auxiliary assembly elements, however, keeps these additional costs limited. The big technical and economic advantage is that the mounting devices for the machine part are held by the auxiliary mounting element in such a position that, after moving the machine part into the assembly position, the mounting devices are available in true position and may be moved into their functional mounting position.

Preferably the auxiliary assembly element consists of a plastic element which may be produced with a spray process simply and inexpensively in a form which is adjusted to the machine apart. Such an auxiliary assembly element has a low weight and may be used multiple times.

The auxiliary assembly preferably consists of a base element extending in the primary level of the machine part from which projections protrude which enclose the machine part and/or reach into the machine part, and which may be connected to and easily removed from the machine part. A plug-in connection is usually sufficient and easily managed.

In addition, it is suggested that supports in the form of through-holes are provided in the auxiliary assembly element for the mounting devices into which the mounting devices may be moved and positioned so that they may be inserted. This ensures that the mounting devices may be picked up during assembly by a common tool and may be moved through the auxiliary assembly element into the connection position with the machine housing.

In order to prevent the loss of a mounting device during transport and storage, it is suggested that the through-holes in the auxiliary assembly element are equipped with arresting aids so that the mounting devices may be accommodated and removed. In addition, it appears to be advantageous if the through-holes have additional guiding aids for the positioning during transport and storage as well as for the supply of the mounting devices into the machine part in true position during assembly.

In addition, it is suggested that the extension of the auxiliary assembly element corresponds approximately to the length of the mounting devices. This ensures that the mounting devices do not project from the auxiliary assembly element during transport and storage. This permits that the auxiliary assembly elements with the machine parts may be stacked. This is particularly significant when the auxiliary assembly element including machine part is picked up by an industrial robot.

In the known auxiliary assembly elements of plastic materials for housing sealing covers with integrated radial shaft sealing ring and through-holes for mounting screws, particularly for crank shaft, cam shaft, and gear housings of combustion engines, consisting of an essentially radially extending base element with at least one axially extending ring-shaped projection for concentric accommodation of the housing sealing cover, it is suggested that the auxiliary assembly element is equipped with supports to accommodate and position the mounting screws so that they are position-oriented. According to the invention the known auxiliary assembly elements for housing sealing covers are improved to the extent that the mounting screws may be received by the auxiliary assembly element in true position and are held in this position during transport and storage up to the time of assembly, in order to be screwed directly through the housing cover hole into the threaded hole of the crank shaft or gear housing, resp., by using a common tool. Preferably a collar in the radial outer circumference of the auxiliary assembly element which is axially angled is provided during assembly as support against the crank shaft housing. This is advantageous when the mounting screws are pressed axially out of the supports of the auxiliary assembly element into the threaded holes of the crank shaft housing.

An additional design of the invention provides that the support to accommodate one mounting device consists of one each essentially axially positioned, radially elastic extendable projection with a through-hole for one mounting screw. When the mounting screw is moved into the through-hole, the projection expands radially elastically and holds it after the projection has sprung back.

According to an additional characteristic of the invention, the projection may be made elastic resilient by axially running slots or similar. This results in tongue-shaped projections. Preferably each support consists of at least three tongue-shaped, essentially axially aligned projections. The latter preferably have recesses to house and arrest the screw head. These recesses are designed such that the head of the mounting screws may be pressed in and out.

Advantageously, mounting screws with parts which project radially beyond the screw head, such as protuberances, flanges, shoulders, or similar, are used while the radially projecting parts, such as the shoulder of a shoulder head screw, may be pressed in and out of the recesses.

In addition, the design of the axially aligned projections is advantageous with extensions, which extend in the direction of the screw shanks. This ensures a centric support of the mounting screw shanks, and the screws are held in exactly aligned position so that during assembly the screws are held centric to the threaded holes of the crank shaft or gear housing, resp., in the auxiliary assembly element.

In addition, the invention suggests that in the auxiliary assembly element centering lugs are provided which extend axially beyond the picked-up machine part or the picked-up housing sealing cover, resp., in the direction of the machine housing, and which during assembly, particularly when the parts to be mounted are joined, permit that the parts are arranged position-oriented to each other. It is not significant whether the centering lugs reach into corresponding cut-outs in the machine housing or whether the centering lugs orient themselves on projecting edges of the machine housing during assembly. For a clear positioning or centering, resp., of the parts at least two centering lugs should be provided on the auxiliary assembly element.

Finally, it seems appropriate to attach arresting clamps on the auxiliary assembly element for a correctly positioned connection with the machine part or with the housing sealing cover, resp., where several arresting clamps increase the precision in regard to positioning. Centering lugs and arresting clamps may be combined such that the centering lug is part of the arresting clamp.

DESCRIPTION OF THE DRAWINGS

A design example of the invention is shown in the drawing and is described in more detail below.
Shown are.

DESCRIPTION OF THE PREFERRED EMBODIMENT

Figure 1:
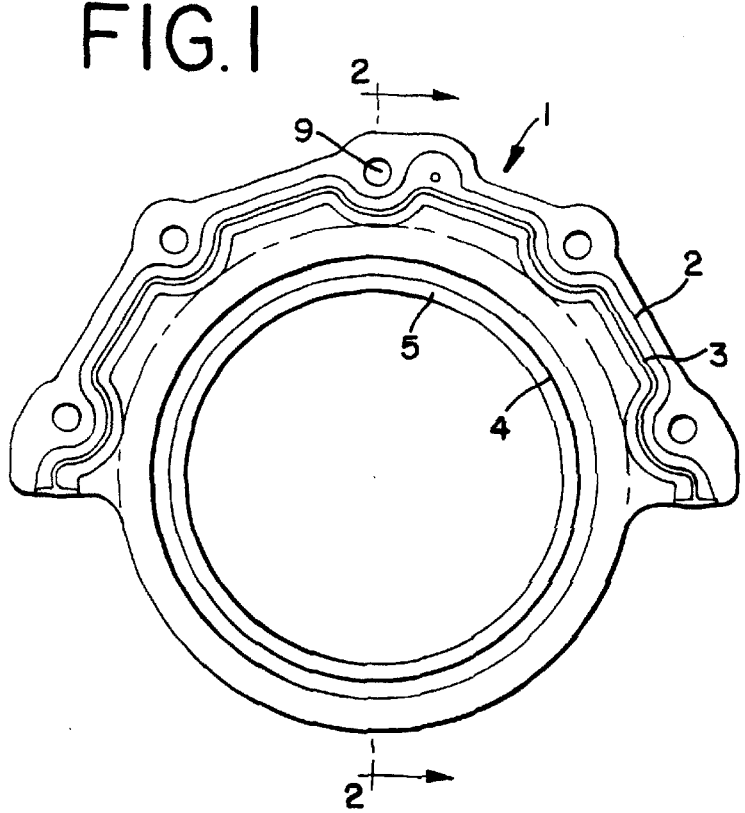
FIG. 1 a view of a housing sealing cover for the crank shaft exit of a crank shaft housing on the gear side of a combustion engine, FIG. 2 a cut I—I of the housing cover according to FIG. 1, FIG. 3 a view of an auxiliary assembly element for the housing sealing cover shown in FIG. 1 and FIG. 2, FIG. 4 a cut II—II of the auxiliary assembly element according to FIG. 3, FIG. 5 a view of the auxiliary assembly element according to FIG. 3 and FIG. 4 with attached housing sealing cover according to FIG. 1 and FIG. 2, FIG. 6 a cut III—III according to the information in FIG. 5, FIG. 7 an enlarged cut of detail A according to the information in FIG. 6 during assembly, FIG. 8 detail A according to FIG. 6 after assembly.
Figure 2:
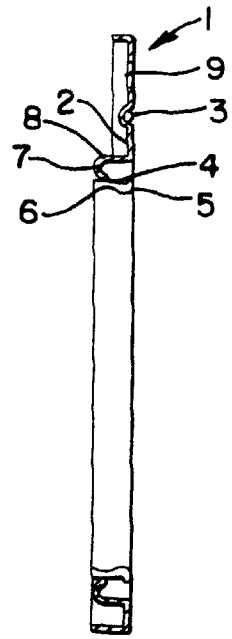

The housing sealing cover shown in FIG. 1 and FIG. 2 consists of a deep-drawn metal element with a radial flange 2, which, in mounted condition, rests on the crank shaft housing 26 of a combustion engine (see FIG. 8). For a static seal a seal bulge 3 of elastomer material is provided. In the radial inner area of the housing sealing cover 1 a radial shaft sealing ring 4 of elastomer material is attached, which is equipped with two sealing lips 5 and 6, which during assembly rest on the surface of the crank shaft 29 (see FIG. 8) under radial tension. The accommodation of the radial shaft sealing ring 4 takes place on a collar 7 of a cylindrical recess 8. Mounting screws 22 designed as shoulder head screws which may be inserted through the bore holes 9, are provided to mount the housing sealing cover 1 on the crank shaft housing 26 (See FIG. 7 and FIG. 8).

Figure 3:
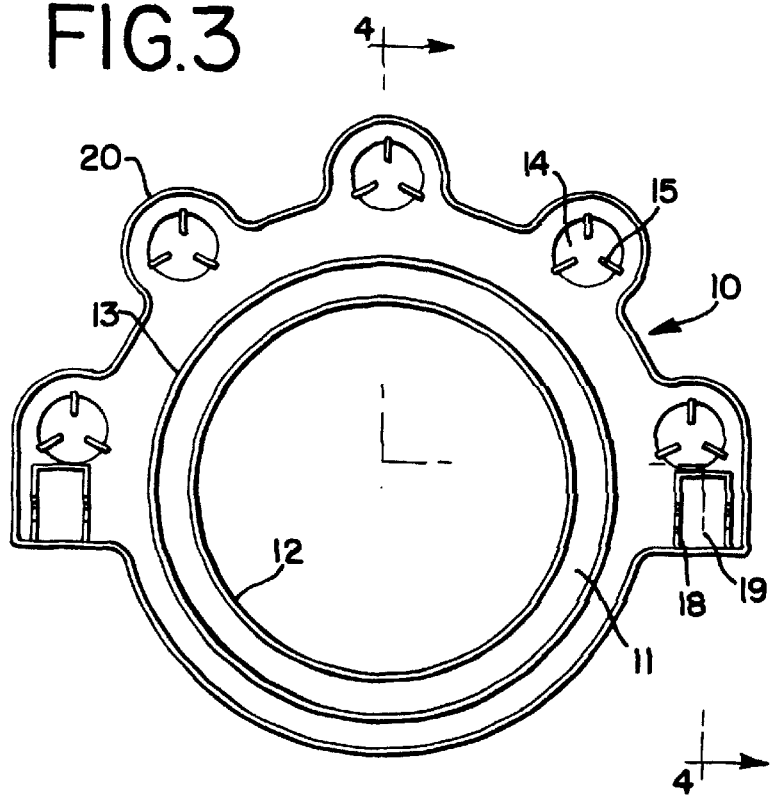
Figure 4:
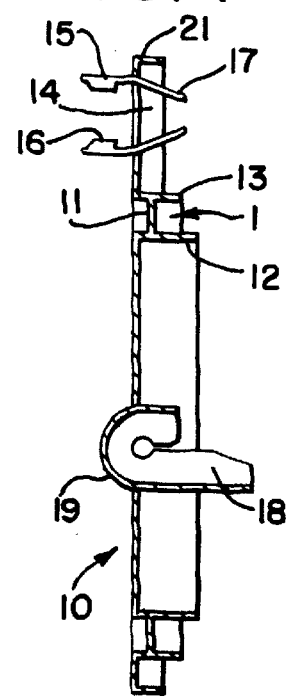

For the automatic assembly of the housing sealing cover 1 an auxiliary assembly element 10 of a polyamide plastic material is provided, as shown in FIG. 3 and FIG. 4. The auxiliary assembly element 10 consists of a base element 11, which essentially extends radially and is equipped radially inside with an axially aligned projection 12 in the form of a cylindrical shell for the radial support of the sealing lips 5 and 6 of the housing sealing cover 1 (see FIG. 2) during transport and storage as well as for simplified mounting on the crank shaft 29. A second, also cylindrical, axially aligned projection 13 is designed for the auxiliary assembly element 10 to be attached and to centrically held on the recess 8 of the housing sealing cover 1. According to the location of the mounting screws 22 the auxiliary assembly element 10 is equipped with supports 14 which consist of three each tongue-shaped, essentially axially aligned projections 15. The latter have slot-shaped recesses 16 as arresting aids to house the shoulder 23 of the mounting screws 22 (see FIG. 7). In addition, the projections 15 are equipped with axial extensions 17, serving as guiding aids, and extending in the direction of the screw shanks 24 (see FIG. 7). The auxiliary assembly element 10 additionally has two axial projecting centering lugs 18, which are arranged in the direction of the housing sealing cover 1, and which are part of two arresting clamps 19. On the outer circumference 20 of the auxiliary assembly element 10 an axially angled collar 21 is provided as additional support.

FIGS. 5 through 7 show the auxiliary assembly element 10 which is attached on the housing sealing cover 1. The axial projection of the auxiliary assembly element 10 encloses the cylindrical recess 8 of the housing sealing cover 1, while the shell-shaped axial projection 12 of the auxiliary assembly element 10 extends into the radial shaft sealing ring 4 of the housing sealing cover 1 with simultaneous radial expansion of the sealing lips 5 and 6. In addition, the auxiliary assembly element 10 with its two arresting clamps 19 is attached on axially projecting collar parts 20' and 20" of the housing sealing cover 1, while the centering lug 18 of the auxiliary assembly element 10 results in a clear alignment and position-securing of the housing sealing cover 1 to the auxiliary assembly element 10.

The connection element consisting of auxiliary assembly element 10 and housing sealing cover 1 may be stacked position-oriented and may therefore be transported, stored, picked up by an industrial robot, and moved into mounting position without a problem.

The detail A, shown enlarged in FIG. 7, shows in particular the support 14 for the mounting screws 22 which are held arrested with their collar 23 in the recesses 16 of the tongue-shaped projections 15 after axial supply. The screw shanks 24 of the mounting screws 22 are aligned exactly via the extensions 17 so that they, when the housing sealing cover 1 is mounted, are positioned precisely in front of the threaded holes 25 of the crank shaft housing 26 (FIG. 8) and may be easily screwed in. Screwing in the mounting screws 22 takes place with common tools 27, which are only indicated in the drawing, and which, when placed on the screw head 28, simultaneously expand the tongue-shaped projections 15 radially outward, thereby freeing the collar 23 of the mounting screws 22, so that the screw shank s 24 of mounting screws 22 may be screwed into the threaded holes 25 of the crank shaft housing 26.

The advantages of the invention shown in this design example may be applied in principle to many machine parts which require additional mounting devices in order to be mounted. For instance, it may concern simple seal covers of gear housings; it is also feasible to equip valve covers and oil pans of combustion engines with the auxiliary assembly elements according to the invention by the valve cover or oil pan manufacturer, resp., in order to achieve the above mentioned advantages during transport, storage and especially during fully automatic assembly.

Those skilled in the art will recognize that a particular application of the inventive concept is using the form of positioning element described to aid in positioning a rear crankshaft seal assembly adjacent a planar end face on an engine block. The seal assembly is preferably of the type that includes an elastomeric seal body forming a part of a larger carrier unit. The carrier unit has a radial flange, a static seal or gasket formed in the flange, and a generally cylindrical pocket or offset portion defined by an axial section and a radial flange to which the seal body is bonded.

The positioning element not only carries the fasteners in aligned or registered position relative to the carrier, but also engages both the outer circumference of the offset portion axial flange and the seal band on the inside diameter of the elastomeric seal body. For this latter purpose, a short axial sleeve or collar that slides over the OD of the crankshaft end is provided. After the combination seal and carrier are installed on the engine, the positioning element is removed and the elastomeric seal lip slides off the sleeve and engages the crankshaft in its intended operating position. This prevents distorting the seal lip as the seal is initially positioned over the end of the crankshaft.

It will thus be seen that the present invention provides a novel auxiliary assembly element having a number of advantages and characteristics, including those pointed out herein and other which are inherent in the invention. Preferred methods and apparatus have been shown by way of example, it is anticipated that modifications and variations to the described form of the invention will occur to those skilled in the art, and it is anticipated that such variations or modifications may be made without departing from the spirit of the invention or the scope of the appended claim.

I claim:

1. A fastener holding device capable of repeated use, comprising, in combination, a body with an axially extending flange having a working clearance fit over a first part associated in use with said flange, a second axially extending flange adapted to hold a surface of a second part to be fastened in place on a machine housing by a plurality of fasteners, said body holding said flanges in fixed relation to each other, and a third element adapted to retain a plurality of fastener-receiving fingers, each fastener-receiving finger being flexibly attached to said body, said fastener-receiving fingers comprising at least three generally axially extending legs and a pocket for each leg, said pocket being adapted to grasp the enlarged head portion of said fastener and transiently prevent movement of said fastener in both axial directions thereof, said pockets and said axial legs deflecting sufficiently to allow said fasteners to be pressed into fastener-receiving openings in said machine housing when said fastener is engaged with a fastener driver and axial force is applied to said fastener driver, said legs of said fastener-holding device being deflectable so as to permit said fastener to engage said machine housing, and release the engagement of said fasteners with said holding device.

2. A fastener holding device as defined in claim 1, wherein said device is made of a plastic material.

3. A fastener holding device as defined in claim 2, wherein said plastic is a flexible thermoplastic material which may deflect repeatedly without damage to it.

4. A fastener holding device as defined in claim 1, wherein said body is generally in the form of a ring.

5. A fastener holding device as defined in claim 1, wherein said first part is a portion attached to the crankshaft of an auto or truck by a slip fit, concentric connection.

6. A fastener holding device as defined in claim 1, wherein said fasteners and said device have an approximately equal axial extent.

7. A fastener holding device as defined in claim 1, wherein said first flange is also adapted to hold the lip portion of a seal away from the crankshaft with which it is to be associated in use, said lip seal thereby engaging said crankshaft portion by the innate resiliency of the lip seal when the device holding it spaced from the crankshaft is withdrawn.

8. A fastener holding device as defined in claim 1, wherein said body is adapted to hold a seal assembly for a combustion engine, said second axially extending flange snugly but removably engaging said axial flange portion of an oil seal.

9. A fastener holding device as defined in claim 1, said device including at least one arresting clamp positionable in registration with said machine part whereby to aid in the aligning of the machine part and the sealing cover.

10. A fastener holding device as defined in claim 9, wherein said at least one arresting clamp includes a centering lug.

11. A fastener holding device as defined in claim 1, wherein the device is intended to mate with an engine housing which includes a third axial flange portion that registers with a portion of said engine to insure correct alignment of said fastener holding device.

\* \* \* \* \*